United States Patent
Umeda

(10) Patent No.: US 6,684,032 B1
(45) Date of Patent: Jan. 27, 2004

(54) OPTICAL SIGNAL RECEIVER APPARATUS

(75) Inventor: Toshiyuki Umeda, Inagi (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/525,485

(22) Filed: Mar. 16, 2000

(30) Foreign Application Priority Data

Mar. 19, 1999 (JP) .......................................... 11-076583

(51) Int. Cl.⁷ .......................... H04B 10/06; H01L 29/26
(52) U.S. Cl. ...................... 398/202; 398/203; 398/204; 257/80; 257/82
(58) Field of Search ............................. 359/189, 194; 257/80, 82; 398/202, 203, 204, 206, 208

(56) References Cited

U.S. PATENT DOCUMENTS

| | | | |
|---|---|---|---|
| 5,023,447 A | * | 6/1991 | Masuko et al. ......... 250/227.24 |
| 5,122,893 A | * | 6/1992 | Tolbert ....................... 359/152 |
| 5,625,181 A | * | 4/1997 | Yasuda et al. ........... 250/214 A |
| 6,074,102 A | * | 6/2000 | Oikawa ........................ 385/88 |
| 6,333,804 B1 | * | 12/2001 | Nishiyama et al. ......... 359/189 |

FOREIGN PATENT DOCUMENTS

JP  06-120743  4/1994

OTHER PUBLICATIONS

Background Art Information sheet reference No. 13 G 23648 dated Sep. 29, 1999.

* cited by examiner

*Primary Examiner*—Leslie Pascal
*Assistant Examiner*—M. R. Sedighian
(74) *Attorney, Agent, or Firm*—Michael Best & Friedrich, LLC

(57) ABSTRACT

An optical signal receiver apparatus is comprised of a photodiode for converting an input photo-signal into a photoelectric current and an integrated circuit having a transimpedance amplifier for converting the photoelectric current into a voltage signal and amplifying it. The power source line of the photodiode can be shortened by supplying a power source current to the photodiode through a current detector in the integrated circuit. In addition, a current drain circuit is used to drain a DC current from the input side of the transimpedance amplifier on the basis of the detection result obtained by the current detector. The current drain circuit is operated when a photoelectric current is output from the photodiode.

16 Claims, 3 Drawing Sheets

OPTICAL SIGNAL RECEIVER APPARATUS

CROSS-REFERENCE TO RELATED APPLICATIONS

This application is based upon and claims the benefit of priority from the prior Japanese Patent Application No. 11-076583, filed Mar. 19, 1999, the entire contents of which are incorporated herein by reference.

BACKGROUND OF THE INVENTION

The present invention mainly relates to an optical signal receiver apparatus and, more particularly, to an optical signal receiver apparatus including, as discrete components, a photo-detector such as a photodiode and an integrated circuit having at least an amplifier.

An optical signal receiver apparatus having the function of receiving a transmitted photo-signal and converting it into an electric signal is indispensable for an optical communication system. An optical signal receiver apparatus capable of high speed communication uses a PIN photodiode as a photo-detector, converts a photoelectric current (signal current) from the PIN photodiode into a voltage signal by using a transimpedance amplifier, and outputs the signal.

In such an optical signal receiver apparatus, the PIN photodiode and transimpedance amplifier are manufactured in different processes. The former is manufactured as an element chip, and the latter is manufactured as an integrated circuit. These two components are electrically connected through bonding wires.

As the transmission rate of an optical communication system is increased for high speed communication, an improvement in high-frequency transmission characteristics is required to broaden the transmission band. If the transmission band is broadened to several GHz, bonding wires, which pose no problem in a low-frequency range, produce an adverse effect. With this adverse effect, the high-frequency transmission characteristics deteriorate. That is, bonding wires serve as inductances in a high-frequency range.

In a conventional optical signal receiver apparatus, the power source line of a photodiode as a photo-detector is much longer than the signal line of the photodiode. For this reason, if a photo-signal transmission band is as wide as several GHz, the band is limited, resulting in a decrease in gain in a high-frequency range, in particular.

BRIEF SUMMARY OF THE INVENTION

It is an object of the present invention to provide an optical signal receiver apparatus which can sufficiently shorten not only the signal line of a photo-detector but also its power source line, and can properly receive a wideband photo-signal like a signal in a GHz band.

It is another object of the present invention to provide an optical signal receiver apparatus which can realize stable operation even at the time of reception of a high-level photo-signal.

According to the present invention, there is provided an optical signal receiver apparatus comprising a photo-detector configured to convert a photo-signal into an electric signal, an integrated circuit incorporating an amplifier which amplifies the electric signal, and a power source supply section which supplies a power source current to the photo-detector through the integrated circuit.

With this arrangement, for example, the signal terminal and power source terminal of the photo-detector can be directly connected to the integrated circuit with boding wires. This makes it possible to sufficiently shorten the power source line of the photo-detector as well as the signal line of the photo-detector which extends to the amplifier in the integrated circuit. Therefore, when a photo-signal in a wide band is to be received, a band is not cut off up to a high frequency. This can realize proper receiving operation while making the most of the element characteristics of the photo-detector such as a PIN photodiode.

In addition, in the present invention, the integrated circuit incorporates a current detector which is inserted in a power source supply path to the photo-detector to detect a power source current flowing into the photo-detector by utilizing the operation of supplying a power source current to the photo-detector through the integrated circuit. Various control operations can therefore be performed by using the detection results obtained by this current detector.

For example, this apparatus includes a current drain circuit which compares a predetermined reference voltage with a voltage corresponding to the power source current detected by the current detector, and drains a DC current from the input side of the amplifier when the voltage corresponding to the power source current is equal to or higher than the reference voltage. This makes it possible to prevent any unnecessary DC current from flowing into the amplifier at the time of reception of a high-level photo-signal and realize stable operation of the amplifier.

More specifically, the current detector is formed from a resistor and designed to convert a power source current flowing into the photo-detector into a voltage whose peak voltage is almost equal to twice a forward voltage drop at a p-n junction or Schottky junction and output the voltage.

The current drain circuit comprises a first level shift circuit constituted by a plurality of series-connected p-n junction elements or Schottky junction elements to obtain the reference voltage, and a second level shift circuit constituted by a plurality of series-connected p-n junction elements or Schottky junction elements to obtain a voltage corresponding to the power source current by level-shifting an output voltage from the photo-detector. The p-n junction elements or Schottky junction elements constituting the second level shift circuit are fewer than the p-n junction elements or Schottky junction elements constituting the first level shift circuit by one. With this arrangement, since the relationship in magnitude between the reference voltage and the voltage corresponding to the power source current detected by the current detector changes depending on whether a photoelectric current is output from the photo-detector, a DC current can be drained on the input side of the amplifier when a photoelectric current flows.

According to the invention, there is provided an optical signal receiver apparatus comprising: a module substrate; a photo-detector mounted on said module substrate to convert a photo-signal into an electric signal; an integrated circuit chip mounted on said module substrate to be juxtaposed with said photo-detector and incorporates an amplifier configured to amplify the electric signal; a bonding wire connecting said photo-detector to said integrated circuit chip; a power source terminal mounted on said substrate to be near said integrated circuit chip and connected to an external power source; and a bonding wire connecting said power source terminal to said integrated circuit chip to supply a power source current from said external power source to said photo-detector through said integrated circuit chip.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
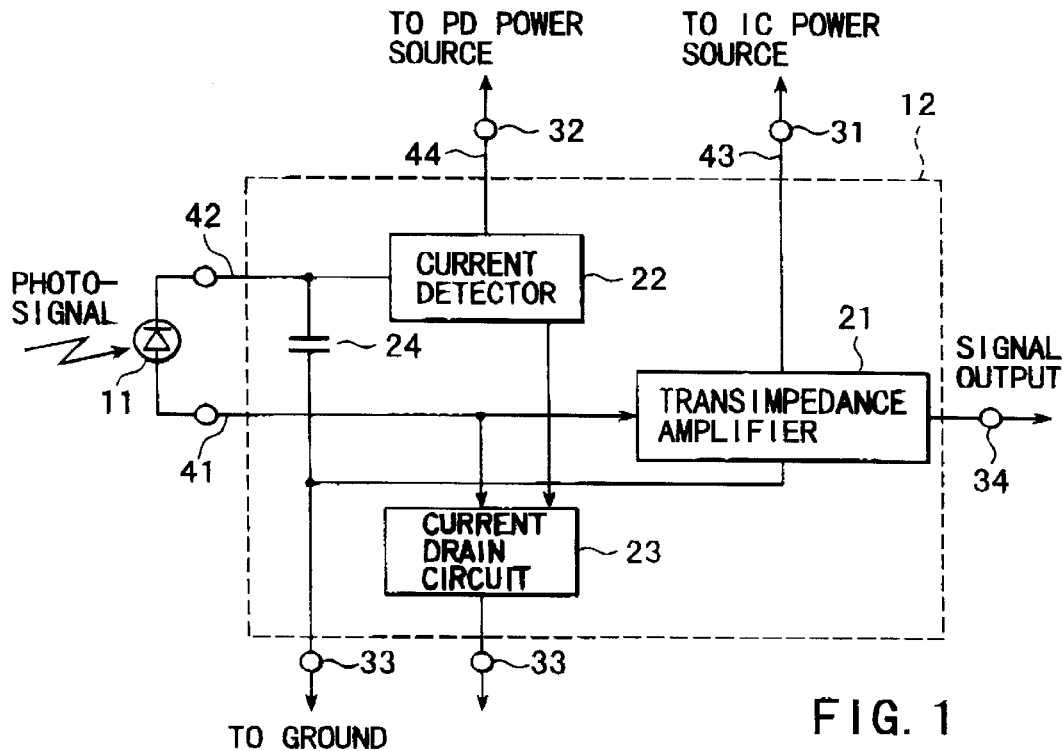
FIG. 1 is a block diagram showing the schematic arrangement of an optical signal receiver apparatus according to an embodiment of the present invention.

An optical signal receiver apparatus according to an embodiment of the present invention will be described with reference to FIG. 1. This optical signal receiver apparatus is mainly comprised of a photodiode 11 as a photo-detector and an integrated circuit 12. The photodiode 11 is an element for receiving a transmitted photo-signal and converting it into a current signal (photoelectric current). As this element, a PIN photodiode is preferably used.

The integrated circuit 12 has a transimpedance amplifier (current-to-voltage conversion amplifier) 21 for converting a photoelectric current from the photodiode 11 into a voltage signal and amplifying it, a current detector 22, a current drain circuit 23, and a capacitor 24. The integrated circuit 12 operates upon receiving power from an IC power source through an IC power source terminal 31. The integrated circuit 12 is also connected to a PD power source terminal 32.

The anode terminal of the photodiode 11 is connected to the input terminal of the transimpedance amplifier 21. The cathode terminal of the photodiode 11 is connected to the PD power source terminal 32 through the current detector 22. That is, power is supplied to the photodiode 11 through the current detector 22 in the integrated circuit 12. The capacitor 24 serves to ground the power source line between the cathode terminal of the photodiode 11 and the PD power source terminal 32 in terms of high frequencies. One terminal of the photodiode 11 is connected to the cathode terminal of the photodiode 11, and the other terminal is connected to a ground terminal 33.

The current detector 22 is a circuit for detecting a power source current flowing from the PD power source into the photodiode 11. The detection result is supplied to the current drain circuit 23. As will be described in detail later, the current drain circuit 23 compares a reference voltage with a voltage corresponding to the power source current detected by the current detector 22, and drains a DC current from the input side of the transimpedance amplifier 21 if the voltage corresponding to the power source current is equal to or higher than the reference voltage, i.e., the photodiode 11 receives a photo-signal and outputs a photoelectric current.

The operation of the optical signal receiver apparatus of this embodiment will be described next.

The optical signal receiver apparatus receives a photo-signal transmitted through, an optical fiber (not shown). Assume that the photo-signal has been binary-modulated. The photodiode 11 receives this photo-signal and outputs a photoelectric current. The photoelectric current from the photodiode 11 is extracted from the anode terminal and converted into a voltage signal by the transimpedance amplifier 21 in the integrated circuit 12. This voltage signal is output from a signal output terminal 34.

The photoelectric current output from the photodiode 11 also propagates from the cathode terminal to the PD power source through the current detector 22 and PD power source terminal 32. In this case, since the power source current from the photodiode 11 is supplied from the PD power source to the integrated circuit 12 through the PD power source terminal 32, the photoelectric current propagating to the PD power source is also input to the integrated circuit 12 through the PD power source terminal 32. This photoelectric current passes through the current detector 22 and is guided to the ground terminal 33 through the capacitor 24. Since the photoelectric current output from the photodiode 11 is not influenced by detour through the power source line of the photodiode 11, the element characteristics of the photodiode 11 can be fully utilized.

In other words, in this embodiment, the line extending from the cathode terminal of the photodiode 11 to the PD power source through the current detector 22 in the integrated circuit 12 is sufficiently short as well as the signal line from the anode terminal of the photodiode 11 to the integrated circuit 12. The lengths of these lines are much smaller than ¼ the maximum frequency of a photo-signal in the transmission band. For this reason, the band is not limited by the signal line and power source line, and a sufficient gain is obtained up to a high-frequency range.

In addition, according to this embodiment, the current drain circuit 23 can prevent any unnecessary DC current from flowing into the transimpedance amplifier 21. This can realize stable operation. More specifically, a photo-signal received by the optical signal receiver apparatus is a binary-modulated signal, which has no information in the amplitude direction. It is therefore only required to detect a binary change in photoelectric current. To input an excessively large photoelectric current to the transimpedance amplifier 21 when a high-level photo-signal is input to the optical signal receiver apparatus is to interfere with the realization of stable operation of the transimpedance amplifier 21.

In this embodiment, the above problem can be solved by utilizing the operation of supplying a power source current to the photodiode 11 through the integrated circuit 12 as follows. The current detector 22 is inserted in the power source path to the photodiode 11 in the integrated circuit 12. when the photodiode 11 outputs a photoelectric current in accordance with the detection result obtained by the current detector 22, the current drain circuit 23 is operated to drain a DC current from the input side of the transimpedance amplifier 21.

Figure 2:
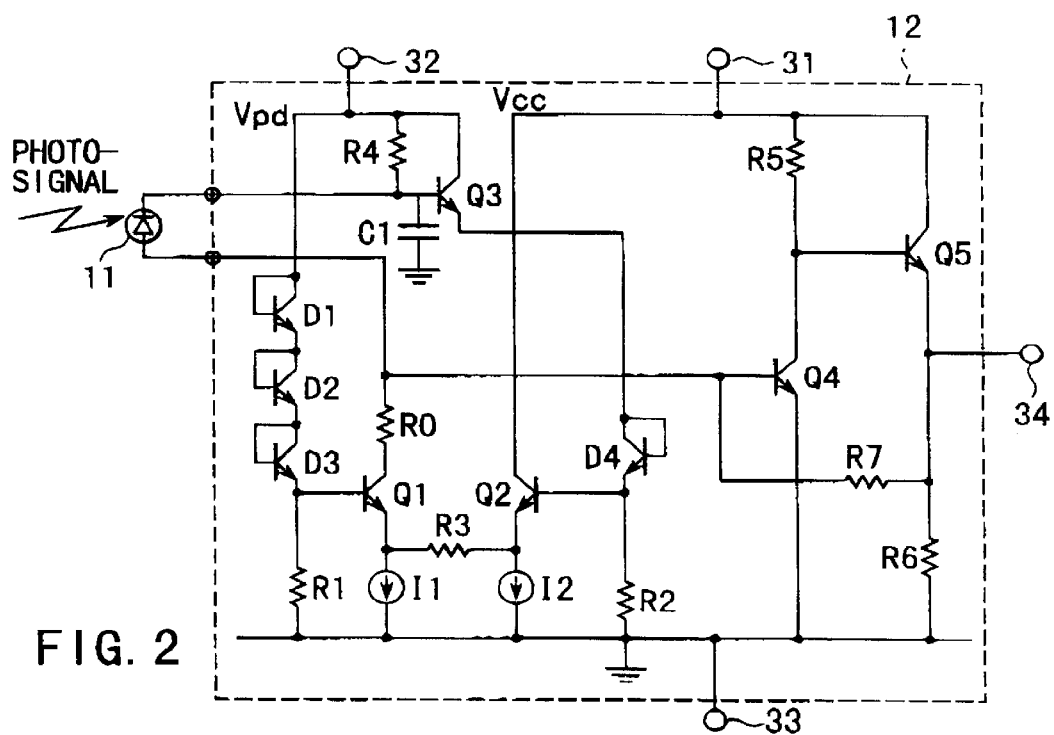
FIG. 2 is a circuit diagram showing the detailed arrangement of an integrated circuit in this embodiment.

A practical example of the internal arrangement of the integrated circuit 12 will be described next with reference to FIG. 2.

The correspondences with the respective components in FIG. 1 will be described. The transimpedance amplifier 21 in FIG. 1 is constituted by transistors Q4 and Q5 and resistors R5, R6, and R7. The transistor Q4 forms an emitter-grounded amplifier (common emitter amplifier) having the resistor R5 as a collector load. The transistor Q5 forms an emitter-follower circuit having the resistor R6 as an emitter load (current source). The emitter electrode of the transistor Q5, which is the output of the emitter-follower circuit, is negatively fed back to the base electrode of the transistor Q4, which is the input of the emitter-grounded amplifier, through the feedback resistor R7. The negative feedback amount is determined by the ratio between the resistances of the resistors R6 and R7.

A current detection resistor R4 forms the current detector 22 in FIG. 1, and is connected between the cathode terminal of the photodiode 11 and the PD power source terminal 32. A capacitor C1 corresponds to the high frequency ground capacitor (bypass capacitor) 24. Transistors Q1, Q2, and Q3, resistors R1, R2, and R3, diodes D1, D2, D3, and D4, and constant current sources I1 and I2 constitute the current drain circuit 23 in FIG. 1. As each of the diodes D1, D2, D3, and D4, a so-called diode-connected transistor whose collector and base electrodes are connected to each other is used. However, a general diode may be used. It is essential only that this element is a level shift element such as a p-n junction element or Schottky junction element (which can be constituted by a MOSFET and the like).

The current drain circuit 23 will be described in detail. The transistors Q1 and Q2, the resistor R3 connected between the emitter electrodes of the transistors Q1 and Q2, and the constant current sources I1 and I2 respectively connected to the emitter electrodes of the transistors Q1 and Q2 constitute a voltage comparator called a linear comparator. A resistor R0 forms an AC cutoff circuit in this case. Of the transistors Q1 and Q2 of the voltage comparator, the transistor Q1 serves as a current drain element. The three diodes D1, D2, and D3 and ground terminal 33 connected in series with each other between the PD power source terminal 32 and the ground terminal 33 constitute the first level shift circuit. This circuit level-shifts a PD power source potential Vpd by an amount corresponding to three p-n junctions, and applies the resultant potential to the base electrode of the transistor Q1 serving as one input terminal of the voltage comparator.

The transistor Q3 whose collector and base electrodes are respectively connected to the two terminals of the current detection resistor R4 and the diode D4 and resistor R2 connected in series with each other between the emitter electrode of the transistor Q3 and the ground terminal 33 constitute the second level shift circuit. This circuit level-shifts a voltage across the current detection resistor R4 by an amount corresponding to two p-n junctions, and applies the resultant voltage to the base electrode of the transistor Q2 serving as the other input terminal of the voltage comparator.

Assume that the resistance of the current detection resistor R4 is set to convert a power source current flowing in the photodiode 11 into a voltage whose peak voltage is almost equal to twice a forward voltage drop (vd) at the p-n junction, i.e., 2Vd. In other words, a resistance is selected for the current detection resistor R4 to produce the voltage drop 2Vd corresponding to two p-n junctions with a maximum current value estimated from the maximum intensity of a photo-signal incident on the photodiode 11.

The operation of the current drain circuit 23 in FIG. 2 will be described next.

Of the transistors Q1 and Q2 constituting the voltage comparator, the transistor Q1 has a base potential Vb1 that is always set to Vb1=Vpd−3Vd. A base potential Vb2 of the transistor Q2 is given by Vb2=Vpd−2Vd because no voltage drop occurs at the current detection resistor R4 when no photo-signal is incident on the photodiode 11 and no photoelectric current flows. Since Vb1<Vb2, and the transistors Q1 and Q2 are off and on, respectively, no current is drained.

Assume that a photo-signal is incident on the photodiode 11, and a photoelectric current flows. In this case, if, for example, this photoelectric current becomes half the maximum current value, the base potential Vb2 of the transistor Q2 becomes Vpd−3Vd like the base potential Vb1 of the transistor Q1. As a consequence, both the transistors Q1 and Q2 are turned on, and about half the maximum current value are drained by the transistor Q1.

When the photo-signal incident on the photodiode 11 reaches the maximum intensity, and the photoelectric current reaches the maximum current value, the voltage drop 2Vd occurs at the current detection resistor R4, and the base potential of the transistor Q2 becomes Vb2=Vpd−4Vd. As a result, Vb1>Vb2, and the transistors Q1 and Q2 are turned on and off, respectively. Therefore, the maximum current value is drained.

This operation of the current detector 22 can prevent any photoelectric current (DC current) from flowing into the transistor Q4 of the transimpedance amplifier 21 even at the time of reception of a high-level photo-signal. This makes it possible to realize stable operation of the transimpedance amplifier 21.

Figure 3:
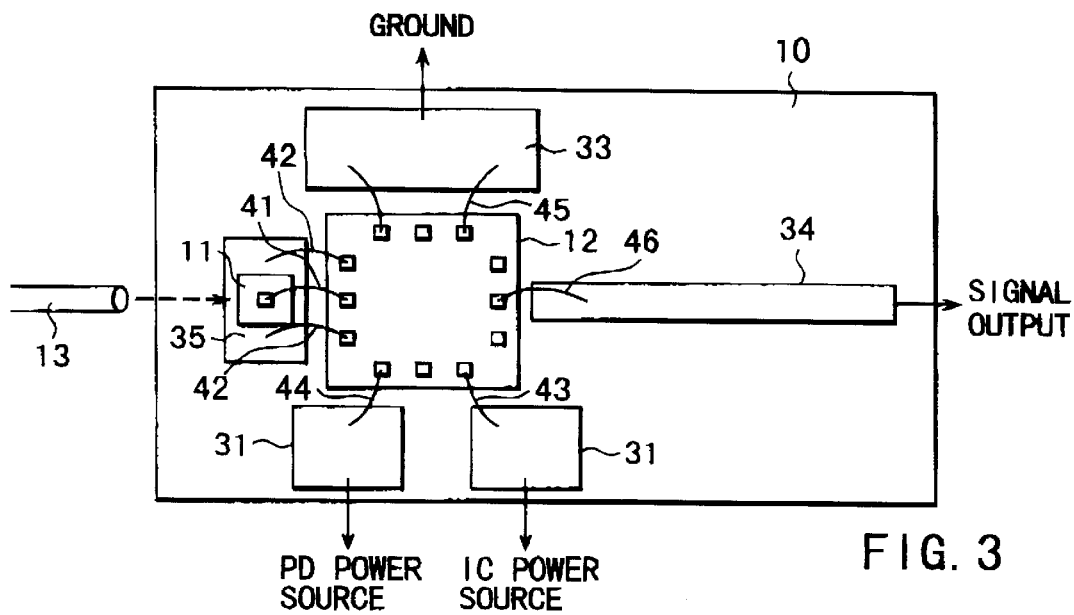
FIG. 3 is a plan view showing an example of how the optical signal receiver apparatus according to this embodiment is mounted.

FIG. 3 shows a practical example of how the optical signal receiver apparatus according to this embodiment is mounted. Referring to FIG. 3, the photodiode 11, integrated circuit 12, and signal output terminal 34 are horizontally juxtaposed with each other on a module substrate 10. The ground terminal 33 is placed on one side (upper side in FIG. 3) of the integrated circuit 12 in the vertical direction of the module substrate 10, and the IC power source terminal 31 and PD power source terminal 32 are placed on the other side (lower side in FIG. 3).

The anode terminal, i.e., the signal-side terminal, of the photodiode 11 is connected to the signal input terminal (the input terminal of the transimpedance amplifier 21) of the integrated circuit 12 with a is bonding wire 41. The cathode terminal, i.e., the power-source-side terminal, of the photodiode 11 is connected to an electrode pad 35. This electrode pad 35 is connected, with bonding wires 42, to pads connected to the current detector 22 in the integrated circuit 12.

In addition, the integrated circuit 12 is connected to the IC power source terminal 31, PD power source terminal 32, ground terminal 33, and signal output terminal 34 with bonding wires 43, 44, 45, and 46, respectively.

A photo-signal transmitted through an optical fiber 13 is guided to the photodiode 11 through an optical system such as a mirror (not shown).

With this arrangement, since a signal component propagating to the PD power source over a photoelectric current generated by the photodiode 11 is also input to the integrated circuit 12, the photoelectric current from the photodiode 11 can be current/voltage-converted by the transimpedance amplifier 21 and amplified without being influenced by the interconnection patterns including the bonding wires on the photodiode 11.

The bonding wire 41 is basically the only signal line between the anode terminal of the photodiode 11 and the integrated circuit 12, and is sufficiently short. In addition, the boding wires 42 and 44 are basically the only power source lines between the cathode terminal of the photodiode 11 and the PD power source terminal 32. The power source lines can therefore be sufficiently shortened. Hence, the band is not limited to the signal lines and power source lines of the photodiode 11, and sufficient gains can be obtained up to a high-frequency range.

The effects of the present invention will be described in detail below.

Figure 4:
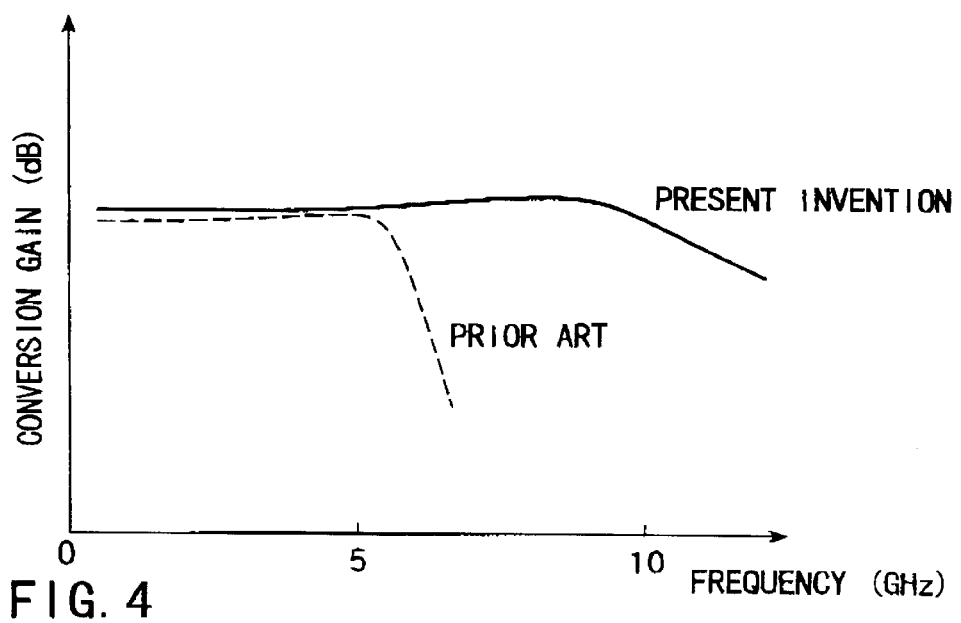
FIG. 4 is a graph showing the frequency characteristics of conversion gains of the optical signal receiver apparatus according to this embodiment and a conventional optical signal receiver apparatus.

FIG. 4 provides a comparison between the frequency characteristics of conversion gain of the optical signal receiver apparatus according to the above embodiment of the present invention and those of the conventional optical signal receiver apparatus. In this case, "conversion gain" is the ratio of the signal output to the energy of a photo-signal incident on the photodiode. In the conventional optical signal receiver apparatus, the conversion gain abruptly decreases at a given frequency, e.g., 5 GHz, whereas in the optical signal receiver apparatus according to this embodiment of the present invention, good characteristics with a constant conversion gain can be obtained up to about twice the above frequency, i.e., up to about 10 GHz.

Figure 5:
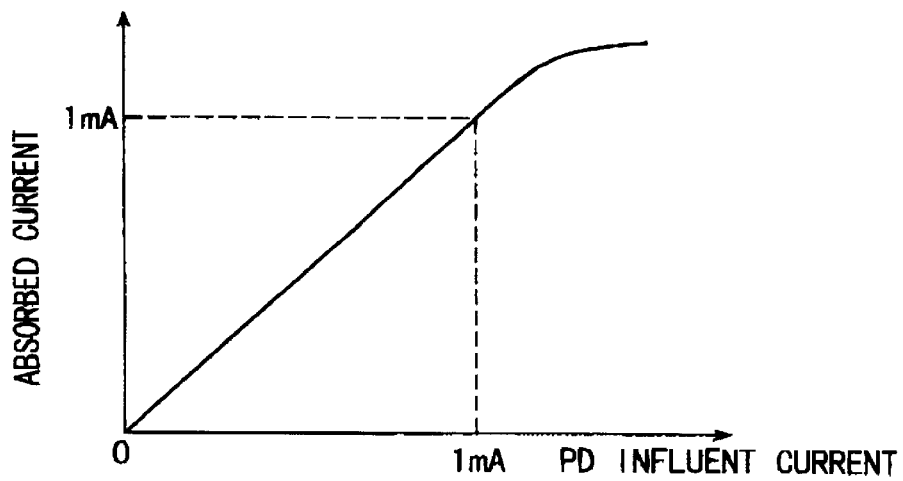
FIG. 5 is a graph showing the relationship between the power source current flowing into a photodiode and the current drained by a current drain circuit in this embodiment.

FIG. 5 shows the relationship between the influent current flowing into the photodiode 11 and the current drained by the current drain circuit 23 in the optical signal receiver apparatus of this embodiment. Obviously, the drained current increases in proportion to the influent current until the influent current exceeds the maximum current value (1 mA in this case). As is apparent, therefore, this embodiment can prevent any unnecessary DC current from flowing into the transimpedance amplifier 21 at the time of reception of a high-level photo-signal, thereby realizing stable operation.

Figure 6:
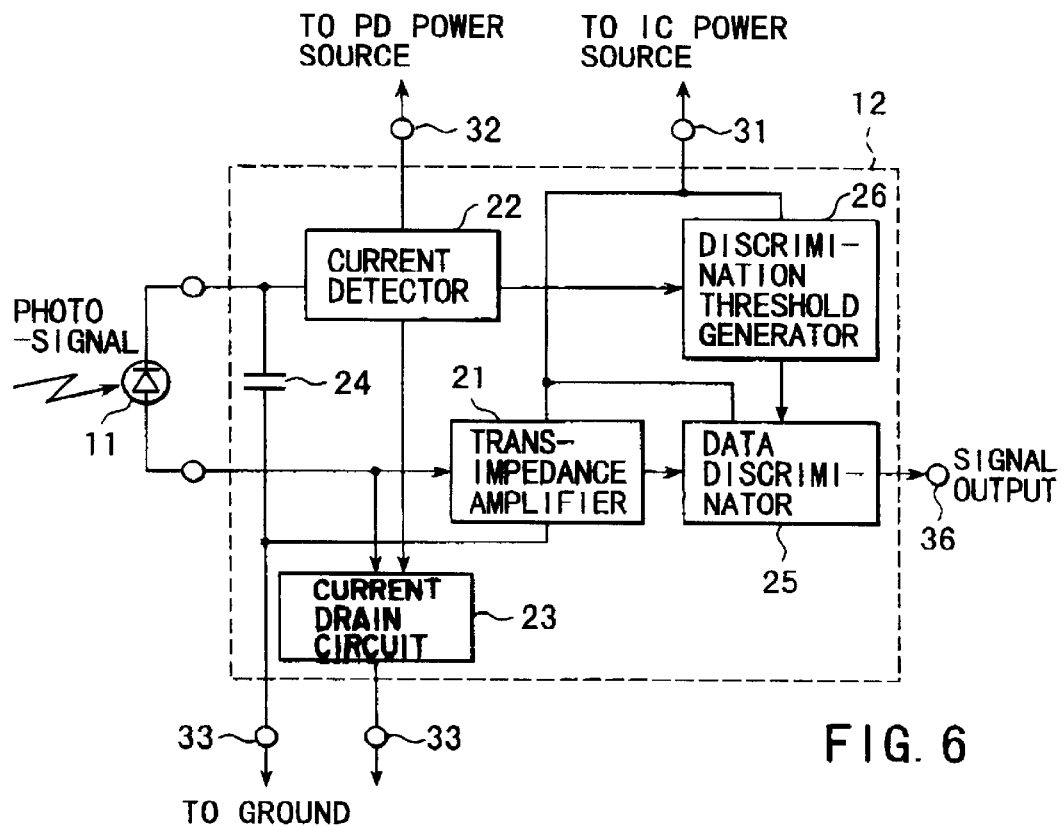
FIG. 6 is a block diagram showing the schematic arrangement of an optical signal receiver apparatus according to another embodiment of the present invention.

An optical signal receiver apparatus according to another embodiment of the present invention will be described next with reference to FIG. 6.

In this embodiment, a data discriminator 25 and discrimination threshold generator 26 are newly mounted in an integrated circuit 12. The data discriminator 25 is a circuit for determining an output signal from a transimpedance amplifier 21 on the basis of threshold, discriminating between "0" and "1", and outputting the discrimination result to a data output terminal 36. The threshold (discrimination threshold) is supplied from the discrimination threshold generator 26.

In this case, the discrimination threshold generator 26 is designed to change the discrimination threshold to be generated in accordance with the magnitude of a power source current from a photodiode 11, which is detected by a current detector 22. AS the intensity of a received photo-signal varies, the power source current flowed into the photodiode 11 changes accordingly. If, therefore, the discrimination threshold is changed to an optimal value in accordance with a change in this power source current, the data discriminator 25 can correctly discriminate between "0" and "1" regardless of changes in the intensity of the photo-signal. This makes it possible to reduce decoding errors on the subsequent stage of the data discriminator 25.

As has been described above, according to the optical signal receiver apparatus of the present invention, not only the signal line of the photo-detector but also the power source line of the photo-detector can be sufficiently shortened, and a wideband photo-signal like a signal in a GHz band can be properly received.

In addition, according to the optical signal receiver apparatus of the present invention, a power source current in the photo-detector is detected, and a DC current is drained at the input side of the amplifier, thereby realizing stable receiving/amplifying operation even at the time of reception of a high-level photo-signal. Therefore, a wide dynamic range with respect to photo-signals can be set.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical signal receiver apparatus comprising:
   a photo-detector configured to convert a photo-signal into an electric signal and having at least one terminal;
   an integrated circuit unit incorporating an amplifier configured to amplify the electric signal and having terminals;
   a first power source terminal connected to a first power source which supplies a power source current to said photo-detector through said integrated circuit;
   a second power source terminal connected to a second power source which supplies a power to said integrated circuit unit; and
   at least one bonding wire connected between the terminal of said photo-detector and at least one of the terminals of said integrated circuit unit.

2. An apparatus according to claim 1, wherein said integrated circuit comprises a current detector which is inserted in a power source line to said photo-detector to detect a power source current flowing into said photo-detector.

3. An optical signal receiver apparatus comprising:
   a photo-detector which converts a photo-signal into an electric signal;
   an integrated circuit incorporating an amplifier configured to amplify the electric signal;
   a power source supply unit configured to supply a power source current to said photo-detector through said integrated circuit;
   a discriminator configured to determine an output signal from said amplifier on the basis of a predetermined threshold and outputting discrimination result data of "0" or "1"; and
   a discrimination threshold generator configured to supply an optimal threshold to said discriminator by changing the threshold to an optimal value in accordance with a magnitude of a current detected by said photo-detector.

4. An optical signal receiver apparatus comprising:
   a photo-detector which converts a photo-signal into an electric signal;
   an integrated circuit incorporating an amplifier configured to amplify the electric signal;
   a power source supply unit configured to supply a power source current to said photo-detector through said integrated circuit;

wherein said integrated circuit comprises a current detector which is inserted in a power source line to said photo-detector, said current detector detecting a power source current flowing into said photo-detector, and a current drain circuit configured to drain a DC current from an input side of said amplifier when a voltage corresponding to a power source current detected by said current detector is not less than a predetermined reference voltage.

5. An apparatus according to claim 4, further comprising a discriminator configured to determine an output signal from said amplifier on the basis of a predetermined threshold and outputting discrimination result data of "0" or "1", and a discrimination threshold generator configured to supply an optimal threshold to said discriminator by changing the threshold to an optimal value in accordance with a magnitude of a current detected by said photo-detector.

6. An apparatus according to claim 1, wherein a signal-side terminal and power-source-side terminal of said photo-detector are connected to said integrated circuit unit with the binding wire.

7. An apparatus according to claim 6, wherein said integrated circuit unit comprises a current detector which is inserted in a power source line to said photo-detector to detect a power source current flowing into said photo-detector.

8. An optical signal receiver apparatus comprising:
a photo-detector which converts a photo-signal into an electric signal;
an integrated circuit incorporating an amplifier which amplifies the electric signal;
a power source supply unit configured to supply a power source current to said photo-detector through said integrated circuit; and
wherein a signal-side terminal and power-source-side terminal of said photo-detector are connected to said integrated circuit with bonding wires, and said integrated circuit comprises a current detector which is inserted in a power source line to said photo-detector do detect a power source current flowing into said photo-detector, and a current drain circuit configured to drain a DC current from an input side of said amplifier when a voltage corresponding to a power source current detected by said current detector is not less than a predetermined reference voltage.

9. An apparatus according to claim 8, wherein
said current detector converts a power source current flowing into said photo-detector into a voltage whose peak voltage is substantially equal to twice a forward voltage drop at a p-n junction or Schottky junction, and outputs the voltage, and
said current drain circuit comprises a first level shift circuit configured by a plurality of series-connected p-n junction elements or Schottky junction elements for obtaining the reference voltage, and a second level shift circuit configured by a plurality of series-connected p-n junction elements or Schottky junction elements to obtain a voltage corresponding to the power source current by level-shifting and output voltage from said photo-detector, the p-n junction elements or Schottky junction elements constituting said second level shift circuit being fewer than the p-n junction elements or Schottky junction elements constituting said first level shift circuit by one.

10. An optical signal receiver apparatus comprising:
a photo-detector configured to convert a photo-signal into an electric signal;
an integrated circuit incorporating an amplifier configured to amplify the electric signal;
a current detector configured to detect a power source current flowing into said photo-detector; and
a current drain circuit configured to drain a DC current from an input side of said amplifier when a voltage corresponding to a power source current detected by said current detector is not less than a predetermined reference voltage.

11. An apparatus according to claim 10, wherein said current drain circuit comprises a first level shift circuit for level-shifting a power source potential of said photo-detector, a second level shift circuit configured to level-shift a detected voltage corresponding to a current detected by said current detector, and a voltage comparator having a function of comparing outputs from said first and second level shift circuits and draining a current in accordance with a detected voltage.

12. An apparatus according to claim 10, wherein said current detector converts a power source current flowing into said photo-detector into a voltage whose peak voltage is substantially equal to twice a forward voltage drop at a p-n junction or a Schottky junction.

13. An optical signal receiver apparatus comprising:
a module substrate;
a photo-detector mounted on said module substrate to convert a photo-signal into an electric signal;
an integrated circuit chip mounted on said module substrate to be juxtaposed with said photo-detector and incorporates an amplifier configured to amplify the electric signal;
at least one bonding wire connecting said photo-detector to said integrated circuit chip;
a first power source terminal mounted on said substrate to be near said integrated circuit chip and connected to a first external power source;
a second power source terminal mounted on said substrate to be near said integrated circuit chip and connected to a second external power source; and
a bonding wire connecting said first power source terminal to said integrated circuit chip to supply a power source current from said first external power source to said photo-detector through said integrated circuit chip.

14. An apparatus according to claim 13, wherein said integrated circuit chip comprises a current detector connected to said photo-detector, said current detector detecting a power source current flowing into said photo-detector.

15. An optical signal receiver apparatus comprising:
a module substrate;
a photo-detector mounted on said module substrate to convert a photo-signal into an electric signal;
an integrated circuit chip mounted on said module substrate to be juxtaposed with said photo-detector and incorporates an amplifier configured to amplify the electric signal;
a bonding wire connecting said photo-detector to said integrated circuit chip;
a power source terminal mounted on said substrate to be near said integrated circuit chip and connected to an external power source, and a bonding wire connecting said power source terminal to said integrated circuit chip to supply a power source current from said external power source to said photo-detector through said integrated circuit chip and wherein said integrated circuit chip comprises a current detector configured to detect a power source current flowing into said photo-detector, and a current drain circuit configured to drain a DC current from an input side of said amplifier when a voltage corresponding to a power source current detected by said current detector is not less than a predetermined threshold voltage.

16. An apparatus according to claim 15, wherein said current detector converts a power source current flowing into said photo-detector into a voltage whose peak voltage is substantially equal to twice a forward voltage drop at a p-n junction or Schottky junction, and outputs the voltage, and said current drain circuit comprises a first level shift circuit constituted by a plurality of series-connected p-n junction elements or Schottky junction elements to obtain the reference voltage, and a second level shift circuit configured by a plurality of series-connected p-n junction elements or Schottky junction elements to obtain a voltage corresponding to the power source current by level-shifting an output voltage from said photo-detector, the p-n junction elements or Schottky junction elements comprising said second level shift circuit being fewer than the p-n junction elements or Schottky junction elements comprising said first level shift circuit by one.

* * * * *